Figure 1:
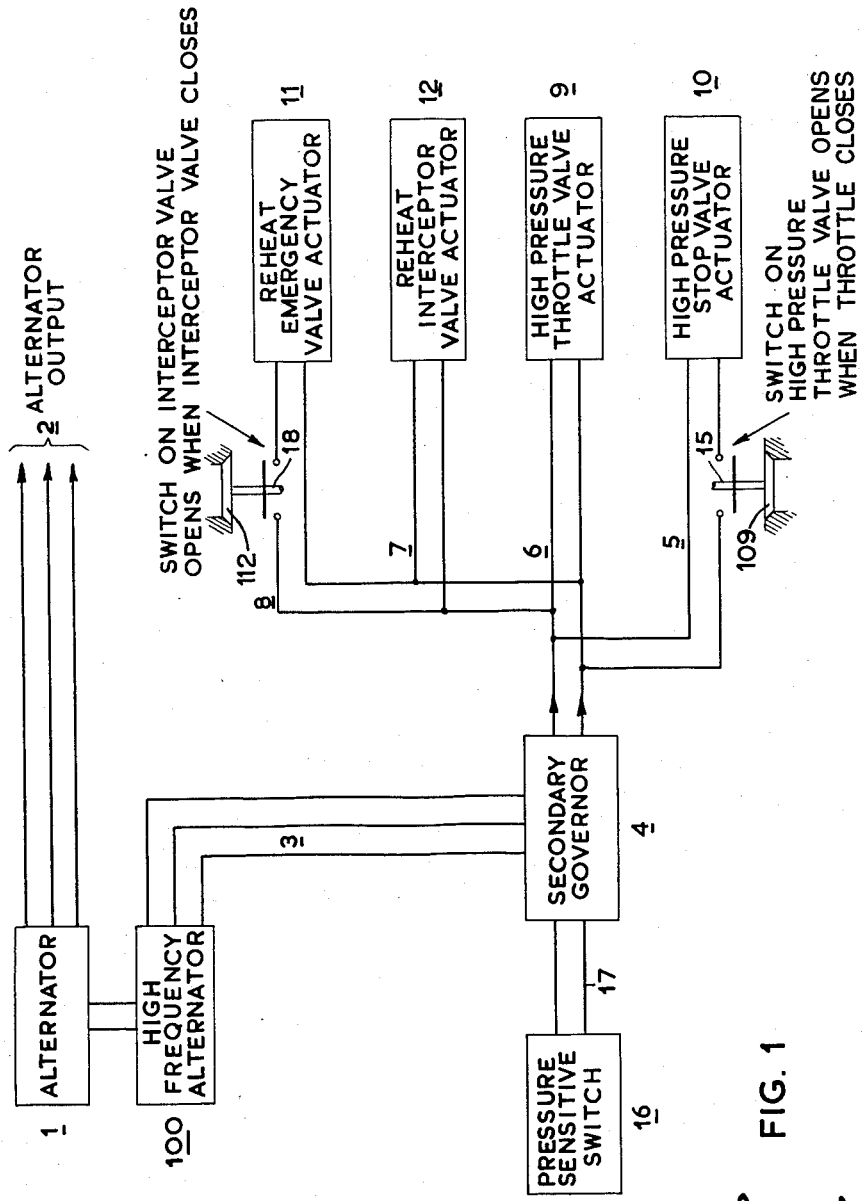

Oct. 30, 1962     J. CALDWELL ETAL     3,060,692
CONTROL GEAR FOR STEAM TURBINES
Filed July 6, 1959     3 Sheets-Sheet 1

INVENTORS:
JOHN CALDWELL
ROBERT WILLIAM PETERS
HENRY WATSON

By: Stevens, Davis, Miller & Mosher
Attorneys 3,060,692
CONTROL GEAR FOR STEAM TURBINES
John Caldwell, Robert William Peters, and Henry Watson, Rugby, England, assignors to The English Electric Company Limited, London, England, a British company
Filed July 6, 1959, Ser. No. 825,278
Claims priority, application Great Britain July 18, 1958
7 Claims. (Cl. 60—73)

The present invention relates to control gear for steam turbines, preferably for large turbine sets, in which there is usually the requirement of keeping the speed of the turbine below the speed at which the emergency trip rings are set (usually 110% of the normal speed) even in the event of the full load or substantial proportion thereof being lost.

In the context of this specification the following terms will be used:

A primary governor is a speed governor, the position of which varies with the rotational speed of the turbine.

A secondary governor is an on/off switch device responsive to the electrical current generated by the alternator driven by the turbine which electrically switches on the actuators of the steam valves of the turbine in the sense of closing said valves when the electrical load of said alternator is lost.

An emergency governor is a tripping device tripping off the steam supply to the turbine at a predetermined overspeed, for example exceeding the normal speed by 10%.

High pressure emergency stop valves are quick closing valves in the steam chest of the high pressure turbine, hitherto only operated by said emergency governor or tripped by hand, and hitherto capable of being opened again only by hand after an emergency stop.

High pressure throttle valves are governing valves operated by said primary governor varying the aperture available to the passage of the high pressure steam in dependence of the position of said primary governor at a speed range between 100% and 104% of the normal speed.

Reheat emergency valves are similar in construction and operation with the aforesaid high pressure emergency valves, and control the entrance of medium pressure steam from the reheater into the intermediate pressure case of the turbine.

Reheat interceptor valves are similar in construction and operation with the aforesaid high pressure throttle valves, but operate in the speed range of between 103% to 105% of the normal speed.

These components are known in the art by themselves.

In the past it has been attempted to keep the speed of the turbine below the speed at which the emergency governor is set, even in the event of the full load or a substantial proportion thereof being lost, by means of a primary and/or secondary governor or an inertia operated governor closing the high pressure emergency stop valves or throttle valves, and where reheat is employed also the reheat emergency valves or interceptor valves. This has not, however, always proved satisfactory, for if the spindles of these valves stick or the valves do not close for any other reason, the speed of the turbine will rise and the emergency trip rings will operate. The trip gear associated with these rings will then close other steam valves in series with the jammed valves, but owing to the time lags and the stored steam effects, the speed of the turbine may exceed the tripping speed and may perhaps reach a very high value. Even if no serious accident occurs, the re-setting of the emergency trip will require the speed to be reduced below normal.

Where both the stop valves and throttle valves are closed by a speed sensitive primary governor, these valves were given a differential setting in their operational ranges, so that the throttle valves are closing first, thus making a time lag necessary in the closing of the high pressure stop valves. The same applies to reheat stop valves and interceptor valves in the case of the employment of reheat.

According to the present invention both the high pressure stop valve and throttle valve, and in the case of reheat also the reheat emergency valve and reheat interceptor valve, are controlled by a load sensitive governor (hereinabove defined as a "secondary governor" as distinguished from the speed sensitive "primary governor") in the sense of closing all of them as rapidly as possible on loss of load. If any of the valves arranged in series with one another at the high pressure inlet or at the reheat fails to close, the valve still in working order there will then keep the turbine speed below that of the setting of the emergency trip rings.

If, on the other hand the throttle valve (and reheat interceptor valve, if any) is in good working order, it is permissible to re-open the high pressure stop valve (and reheat emergency valve, if any) which according to a development of the present invention is automatically effected by an appropriate feed-back connection between the position of the stem of the throttle valve and the actuator of the high pressure stop valve, and between the position of the stem of the reheat interceptor valve and the actuator of the reheat emergency valve, respectively. If the stop valve and/or reheat emergency valve is of the single seat type, it is necessary to open them before the throttle valve or interceptor valve, respectively is opened, since opening the same against full boiler pressure would be impossible.

As an example for the aforesaid automatic feed back connections "on-off" switches mechanically controlled by the spindles of the high pressure throttle valve and reheat interceptor valve respectively, are connected in series preferably through relays with the actuators of the high pressure stop valve and reheat emergency valve, respectively, in the sense that these switches are open when the high pressure throttle valve and reheat interceptor valve, respectively, is closed. Thus these actuators will be de-energised and the valves associated with them will open again automatically.

When the high pressure throttle valve is closed, the exhaust pressure of the intermediate pressure turbine will fall. According to a further development of the invention, a pressure sensitive switch arranged at the exhaust of the intermediate pressure turbine of a turbine set having a high pressure, intermediate and low pressure turbine is connected to the said secondary governor in such a manner as to apply a re-setting signal to the latter when the exhaust pressure of the said intermediate turbine drops below a predetermined value so that the control of the throttle valve and interceptor valve, if any, is returned to the speed-sensitive primary governor.

On the other hand when the throttle valve or interceptor valve does not close, the high pressure stop valve or reheat emergency valve, respectively, will remain closed even after the secondary governor has re-set, because the servomotors of these valves have not sufficient power to re-open the same against full boiler pressure. Thus an additional safety factor is inherent to the arrangement according to the present invention.

Figure 2:
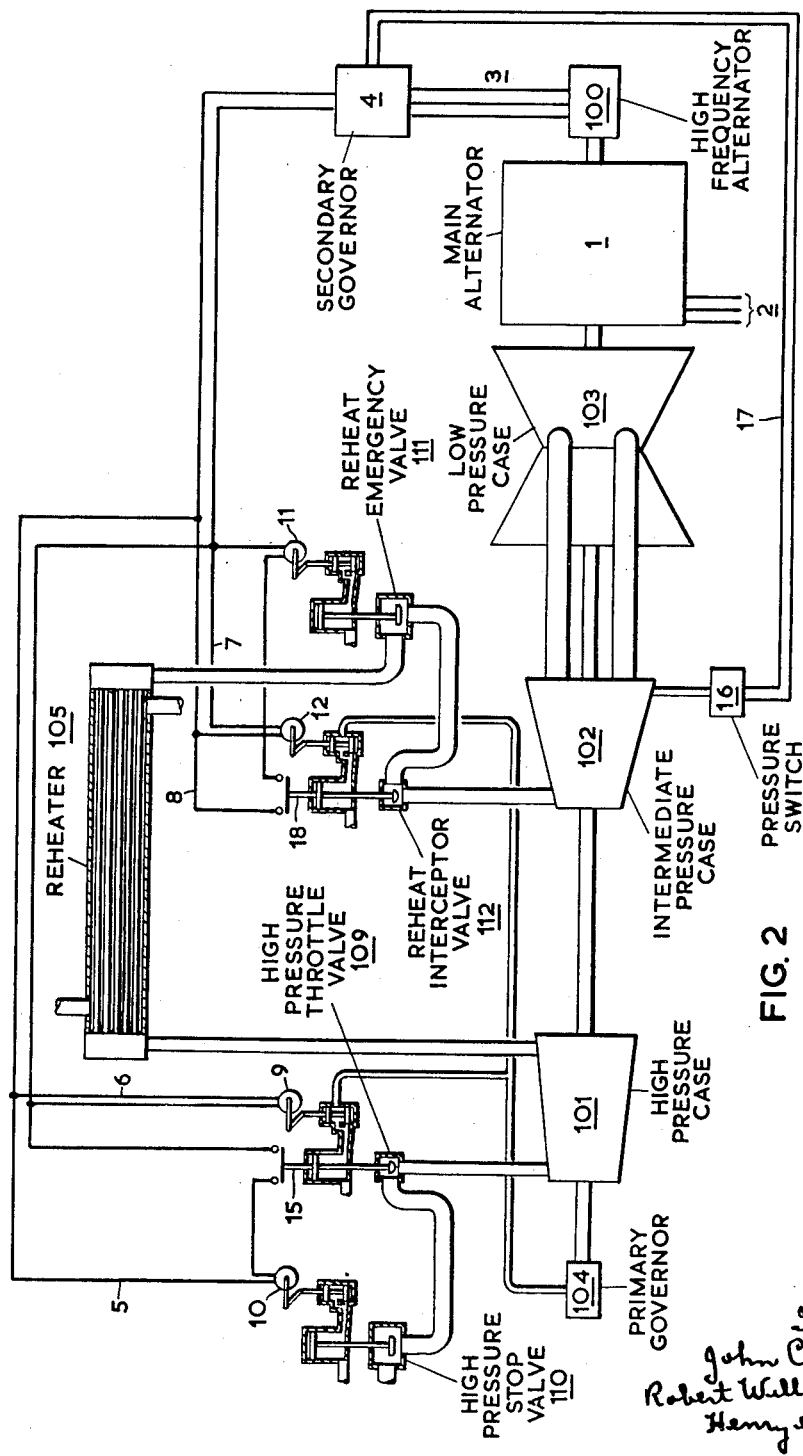

In order that the invention may be clearly understood and readily carried into effect, an embodiment thereof will now be described by way of example with reference to the accompanying drawings:

FIG. 1 of which is a block diagram of a control gear according to the present invention, FIG. 2 of which is a diagrammatical general arrangement of a turbine plant embodying a control gear according to the present invention.

Figure 3:
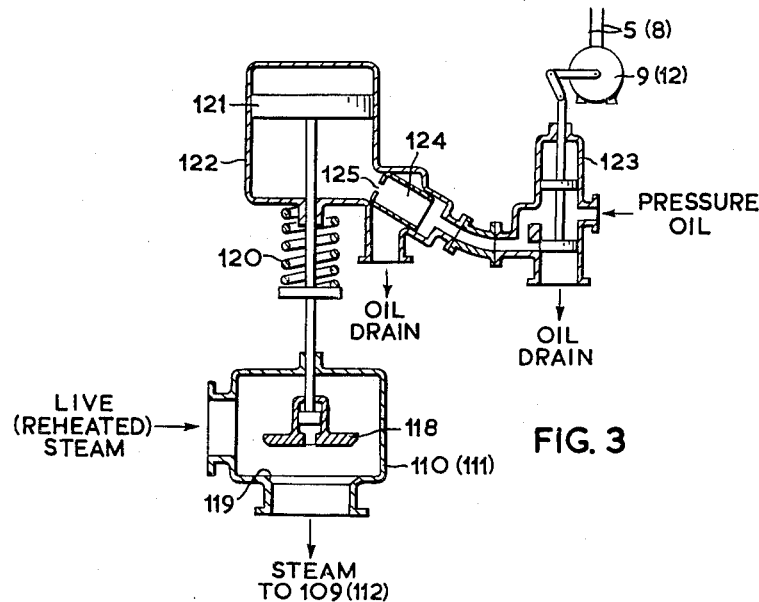
Figure 4:
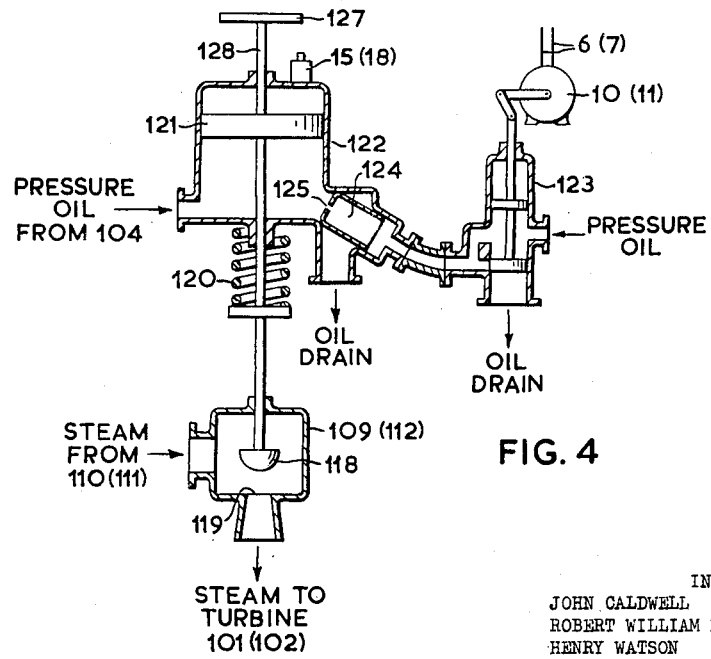

FIG. 3 of which diagrammatically shows a high pressure stop valve or reheat emergency valve in longitudinal section, and FIG. 4 shows likewise a high pressure throttle valve or reheat interceptor valve.

Referring firstly to FIGS. 1 and 2, a main alternator 1 is driven by a steam turbine having a high pressure casing 101, an intermediate pressure casing 102, a double low pressure casing 103, a speed sensitive primary governor 104 and reheater 105 arranged between the high pressure casing 101 and the intermediate pressure casing 102. This alternator 1 is connected to the mains by its output lines 2, and an auxiliary high frequency alternator 100 coupled to the main alternator 1 is connected by lines 3 to a load-sensitive secondary governor 4. The primary governor 104 is connected in the usual way by hydraulic pipe lines, diagrammatically indicated in FIG. 2 to the actuators 9, 10, 11, 12, respectively of the high pressure stop valves 110, high pressure throttle valves 109, reheat interceptor valves 112, and reheat emergency valves 111, the valves 111 and 112 being arranged between the reheaters 105 and the intermediate pressure casing 102 of the turbine.

With the conventional spindles of the high pressure throttle valves 109 and of the reheat interceptor valve 112 on-off switches 15, 18, respectively, are mechanically connected (FIG. 1), which control the circuits 5, 8 of the actuators 10, 11 respectively, of the high pressure stop valves 110 and reheat emergency valves 111 respectively, (FIG. 2), in the sense, that these circuits are open when the valves controlling them are closed.

A pressure sensitive switch 16 exposed to the exhaust pressure of the intermediate turbine 102 is connected by a circuit 17 to the said secondary governor 4 so as to apply a re-setting signal thereto when the exhaust pressure drops below a pre-determined value. The control of the valves 109—112 is thereby returned to the speed sensitive primary governor 104.

The principle of the present invention consists accordingly in that the high pressure stop valve 110 and reheat emergency valve 111, if any, are closed by the secondary governor 4 at the same time as the high pressure throttle valve 109 and reheat interceptor valve 112 respectively, when the load on the turbine 101—103 is lost, and re-open only when it is assured that the said throttle valve 109 and reheat interceptor valve 112, respectively, have closed satisfactorily.

Preferably these valves 109—112 are closed simultaneously by the quick-acting secondary governor 4 when a large proportion of the full load is lost, so as to keep the speed of the turbine 101—103 below the setting of emergency trip rings (not shown), even if one or the other of these valves should have jammed.

The high pressure stop valve 110 and reheat emergency valve 111, if any, are accordingly subject to the said secondary governor 4 in addition to the emergency trip rings, so that the speed of the turbine 101—103 does not approach a dangerous level if a throttle valve 109 or interceptor valve 112 should have failed to close.

Preferably the high pressure stop valve 110 and reheat emergency valve 111, if any, are automatically re-opened by the said switches 15 and 18 after loss of load, as soon as the throttle valve 109 and reheat interceptor valve 112, respectively, have closed properly.

By the use of a conventional single-seat type stop valve 110 and reheat emergency valve 111 (FIG. 3) their re-opening after closing following a loss of load cannot take place against full boiler pressure, if the high pressure throttle valve 109 or reheat interceptor valve 112, respectively, have not properly closed, thus preventing the automatic re-loading of a turbine 101—103 following a faulty operation of a throttle valve 109 or interceptor valve 112, respectively.

FIG. 3 shows a typical high pressure stop valve 110 or reheat emergency valve 111, these valves forming elements known in themselves of the new combination according to the present invention.

The valve head 118 is biased against its seat 119 by a spring 120 and is lifted off its seat by the piston 121 of a hydraulic servo-motor cylinder 122 supplied with high pressure oil from an actuator valve 123 through a dump valve 124 having a restricted orifice 125. The actuator valve 123 is operated by an actuator (torque motor) 9 or 12 respectively, controlled by the secondary governor 4. Upon loss of load the torque motor 9, 12, respectively, raises the actuator valve 123, connecting the space behind the dump valve 124 to drain. The oil below the piston 121, which is under pressure by the bias of spring 120 pushes the drain valve 124 back so as to clear the outlet from the cylinder 122 to drain. Consequently the valve 110 (or 111) is rapidly closed by the spring 120.

FIG. 4 shows in an illustration similar to FIG. 3 a typical high pressure throttle valve 109 or reheat interceptor valve 112. Corresponding components are referred to by the same characters as in FIG. 3. The functioning of valve 109 (or 112) is as explained hereinabove with reference to FIG. 3, with the addition that a switch 15 or 18, respectively (conf. FIG. 1) is mounted on the servo-motor cylinder 122, and an abutment 127 mounted on the piston rod 128 opens said switch when the valve closes.

The cylinder 122 is also connected below the piston 121 to pressure oil from the primary governor 104 in order to control the degree of opening of the high pressure throttle valve 109 or reheat interceptor valve 112.

What we claim as our invention and desire to secure by Letters Patent is:

1. A control gear for a steam turbine comprising in combination: a high pressure emergency stop valve, a high pressure throttle valve arranged in series with said stop valve downstream thereof, each of said valves having an electrically controlled hydraulic actuator, an on/off secondary governor responsive to the load of said turbine and electrically connected to said actuators in the sense of rapidly closing both said stop and throttle valves responsive to a loss of load of said turbine.

2. A control gear as claimed in claim 1, comprising in addition: an on/off switch operatively connected to said throttle valve responsive to the position thereof and electrically connected to the electrically controlled actuator of said stop valve in the sense of opening said stop valve when said throttle valve is in the fully closed position.

3. A control gear as claimed in claim 1, for a turbine having a reheater, comprising in addition: a reheat emergency valve and a reheat interceptor valve arranged in series with one another downstream of said reheater, each of said valves having an electrically controlled hydraulic actuator electrically connected to said secondary governor in the sense of the latter rapidly closing both said reheat emergency and reheat interceptor valves responsive to a loss of load of said turbine.

4. A control gear as claimed in claim 3, comprising in addition: an on/off switch operatively connected to said reheat interceptor valve responsive to the position thereof and electrically connected to said electrically controlled actuator of said reheat emergency valve in the sense of opening said emergency valve when said interceptor valve is in the fully closed position.

5. A control gear as claimed in claim 4, wherein said high pressure emergency stop valve and reheat emergency valve are single seat valves, and wherein said on/off switches operatively connected to said high pressure throttle valve and to said reheat interceptor valve respectively, are so positioned that they are opened just as the said throttle valve reaches its closed position.

6. A control gear for a steam turbine having a reheater comprising in combination: a high pressure throttle valve, a reheat interceptor valve, each of these valves having a valve spindle, an on/off switch mechanically controlled by the said valve spindle in the sense of being "off" when the said high pressure throttle valve and reheat interceptor valve, respectively, is closed, and an electrically controlled actuator operating the said spindle, a high pressure emergency stop valve and a reheat emergency valve each having an electrically controlled actuator operating the same and electrically controlled by the said on/off switch of said high pressure throttle valve and reheat interceptor valve respectively, an on/off secondary governor responsive to the load of said turbine and to the internal steam pressure in said turbine and electrically connected to all of the said actuators in the sense of closing all of the said valves as rapidly as possible in the case of loss of load by the said turbine.

7. A control gear for a steam turbine having a high pressure case, a reheater, an intermediate pressure case and a low pressure case all arranged in series flow connection with one another, a primary governor operatively connected to said turbine and responsive to the rotational speed thereof, and an on/off secondary governor responsive to the load of said turbine and to the internal steam pressure in said high pressure case, a high pressure emergency stop valve and a high pressure throttle valve arranged in series with one another at the entry of said high pressure case, a reheat emergency valve and a reheat interceptor valve arranged in series with one another between said reheater and the entry of said intermediate pressure case, an electrically controlled hydraulic actuator operatively connected to each of said valves, the actuators of said high pressure throttle valve and of said reheat interceptor valve being hydraulically connected to and normally steadily adjusted by said primary governor responsive to the rotational speed of said turbine and all of the said actuators being electrically connected to said on/off secondary governor in the sense of closing all of said valves as rapidly as possible in case of loss of load of said turbine, and a pressure sensitive switch arranged at the exhaust end of said intermediate pressure case and electrically connected to said secondary governor in such a manner as to apply a re-setting signal to the latter when the exhaust pressure of said intermediate pressure case drops below a pre-determined value thereby restoring the control of said high pressure throttle valve and reheat interceptor valve to said primary governor.

References Cited in the file of this patent

UNITED STATES PATENTS

| | | |
|---|---|---|
| 1,103,024 | Bentley | July 14, 1914 |
| 1,676,935 | Taylor | July 10, 1928 |
| 1,917,171 | Warner et al. | July 4, 1933 |
| 2,197,743 | Crafts et al. | Apr. 16, 1940 |
| 2,294,753 | Hedman | Sept. 1, 1942 |
| 2,617,438 | Doran | Nov. 11, 1952 |

FOREIGN PATENTS

| | | |
|---|---|---|
| 475,042 | Germany | Apr. 16, 1929 |
| 244,803 | Great Britain | Dec. 17, 1925 |